(12) United States Patent
Torniainen et al.

(10) Patent No.: US 10,646,868 B2
(45) Date of Patent: May 12, 2020

(54) MICROFLUIDIC FILTERING

(71) Applicant: HEWLETT-PACKARD DEVELOPMENT COMPANY, L.P., Houston, TX (US)

(72) Inventors: Erik D. Torniainen, Maple Grove, MN (US); Nick McGuinness, San Diego, CA (US); David P. Markel, Albany, OR (US); Alexander Govyadinov, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 102 days.

(21) Appl. No.: 16/079,496

(22) PCT Filed: Apr. 28, 2016

(86) PCT No.: PCT/US2016/029846
§ 371 (c)(1),
(2) Date: Aug. 23, 2018

(87) PCT Pub. No.: WO2017/188962
PCT Pub. Date: Nov. 2, 2017

(65) Prior Publication Data
US 2019/0054469 A1    Feb. 21, 2019

(51) Int. Cl.
*B01J 3/00* (2006.01)
*B01L 3/00* (2006.01)
(Continued)

(52) U.S. Cl.
CPC .... *B01L 3/502753* (2013.01); *G01N 15/0272* (2013.01); *B01L 2300/0681* (2013.01);
(Continued)

(58) Field of Classification Search
None
See application file for complete search history.

(56) References Cited

U.S. PATENT DOCUMENTS 2,961,862 A    11/1960  Smith
6,152,559 A    11/2000  Kojima
(Continued)

FOREIGN PATENT DOCUMENTS

CN    104220148    12/2014
DE    102011086235    5/2013
(Continued)

OTHER PUBLICATIONS

Amato, et al., Integrated Three-dimensional Filter Separates Nanoscale from Microscale Elements in a Microfluidic Chip, Lab on a Chip, Jan. 5, 2012, Issue 6, RSC Publishing.
(Continued)

*Primary Examiner* — Chester T Barry
(74) *Attorney, Agent, or Firm* — Dierker & Kavanaugh PC (57) ABSTRACT

In an example implementation, a method of microfluidic filtering includes activating a first fluid pump within a microfluidic channel to cause a forward flow of fluid through the microfluidic channel and through a filter of a filter loop. The filter loop intersects the microfluidic channel at a loop entry and at a loop exit. The method includes activating a second fluid pump to cause a reverse flow of fluid through the filter.

15 Claims, 5 Drawing Sheets

(51) Int. Cl.
*G01N 15/02* (2006.01)
*G01N 15/00* (2006.01)

(52) U.S. Cl.
CPC . *B01L 2300/088* (2013.01); *B01L 2400/0433* (2013.01); *B01L 2400/0442* (2013.01); *G01N 2015/008* (2013.01); *G01N 2015/0053* (2013.01); *G01N 2015/0288* (2013.01)

(56) References Cited

U.S. PATENT DOCUMENTS

| | | |
|---|---|---|
| 7,270,744 B2 | 9/2007 | Petersen et al. |
| 8,991,954 B2 | 3/2015 | Govyadinov et al. |
| 9,325,047 B1 | 4/2016 | Gokhan et al. |
| 2008/0072929 A1 | 3/2008 | White |
| 2009/0083665 A1 | 3/2009 | Anttila et al. |
| 2010/0096325 A1* | 4/2010 | Tsukahara ............ B01D 61/22 210/636 |
| 2010/0252118 A1 | 10/2010 | Fraden et al. |
| 2011/0286493 A1 | 11/2011 | Torniainen et al. |
| 2014/0339161 A1 | 11/2014 | Leonard et al. |
| 2014/0348706 A1 | 11/2014 | Rahman |
| 2014/0353262 A1 | 12/2014 | Troxler |
| 2015/0083665 A1 | 3/2015 | Oranth et al. |
| 2016/0052011 A1 | 2/2016 | Govyadinov et al. |

FOREIGN PATENT DOCUMENTS

| | | |
|---|---|---|
| JP | 2012000065 | 1/2012 |
| JP | 2014525343 | 9/2014 |
| JP | 2015516289 | 6/2015 |
| TW | 201132371 | 10/2011 |
| WO | WO-2009081722 | 7/2009 |
| WO | WO-2014178827 | 11/2014 |
| WO | WO-2016016825 | 2/2016 |
| WO | WO2016122554 | 8/2016 |

OTHER PUBLICATIONS

International Search Report and Written Opinion for International Publication No. PCT/US2016/029846 dated Jan. 25, 2017, 8 pages.
Xu, et al., High Efficiency Integration of Three-dimensional . . . , Scientific Reports, Jan. 28, 2016, Scientific Reports vol. 6, Article No. 19989 (2016), Macmillan Pub. Ltd.

* cited by examiner

MICROFLUIDIC FILTERING

BACKGROUND

Microfluidics has wide ranging application to numerous disciplines such as engineering, chemistry, biochemistry, biotechnology, and so on. Microfluidics can involve the manipulation and control of small volumes of fluid within various systems and devices such as inkjet printheads, lab-on-chip devices, and other types of microfluidic chip devices.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Various biological, chemical, engineering and other applications can employ and depend on the filtration and separation of microparticles. For example, the preparation of samples in many biological applications can involve filtering biological cells from a fluid sample. In a particular example, white blood cells can be filtered or separated from a whole blood sample for subsequent analysis.

Microfiltration systems can incorporate filter components such as membranes, arrays of posts, or other physical structures that have gaps or pore sizes designed to filter or separate particles or objects that exceed a particular size. Thus, the sizes of gaps or pores in a filter component can vary depending on the particular filter application and/or size of particles that are to be filtered from a fluid sample. One challenge often encountered in many microfiltration systems is the clogging or jamming of the filter components. As a filter system operates, filtered particles can clog the pores or gaps in the filter. As the filter becomes more and more clogged with particles, the sample flow rate through the system can be reduced and the pressure needed to continue running the filter can increase. Clogging of the filters can eventually render the filter inefficient or inoperable.

Accordingly, examples of microfluidic filtering devices disclosed herein provide active filtering of fluid samples and/or particle sorting of such fluid samples in addition to active and passive self-cleaning functions that can help prevent filter clogs as well as unclog filters that have become clogged. Filters incorporated within microfluidic channels and filter loop channels can be maintained using active inertial micropumps embedded within the channels. The filter loop channels having integrated filters and micropumps can be nested off of a main fluid channel and can enable forward and reverse fluid flows to facilitate different levels of particle filtering and sorting, as well as filter self-cleaning.

By controlling inertial micropumps embedded within microfluidic channels, the rate and direction of flow of a sample fluid can be controlled through selected filter loop channels to achieve different particle filtration and separation results. Directing sample fluid through nested loop channels having differently sized filters, for example, can enable particle filtration and separation on the basis of decreasing particle size. Thus, active particle filtration and separation is enabled. Similarly, controlling embedded inertial micropumps enables active and passive self-cleaning of filters by providing active (i.e., sensory based) and passive (i.e., timing based) reverse fluid flows through particle filters within microfluidic channels. Controlling fluid flow in forward and reverse directions through the main fluid channel and nested filter loop channels enables parallel and counter fluid flow patterns that can help to keep filters unclogged. In addition, reverse fluid flows can be used to flush clogged particles out of filter gaps and pores. Actively maintaining filters in an unclogged condition can improve the speed, efficiency and productivity of a microfluidic filtering device.

In a particular example, a method of microfluidic filtering includes activating a first fluid pump within a microfluidic channel. The microfluidic channel can extend between a first reservoir and a second reservoir, and the first fluid pump can be located asymmetrically within the microfluidic channel toward the first reservoir to cause a forward flow of fluid through the microfluidic channel from the first reservoir toward the second reservoir and through a filter within a filter loop. The method also includes activating a second fluid pump to cause a reverse flow of fluid through the filter. The reverse flow can clean the filter by dislodging particles that may be clogging the filter. In some implementations activating the second fluid pump includes activating the second fluid pump located asymmetrically within the microfluidic channel toward the second reservoir. The filter loop intersects the microfluidic channel at a loop entry and at a loop exit, and in some implementations activating the second fluid pump includes activating the second fluid pump located within the loop exit.

In another example, a microfluidic filtering device includes a microfluidic channel to communicate fluid between a first reservoir and a second reservoir. A filter loop is coupled to the microfluidic channel at a loop entry, and a filter is located at the loop entry to filter fluid that enters the filter loop from the microfluidic channel. A forward pump is to pump fluid in a forward direction from the microfluidic channel through the filter into the filter loop, and a reverse pump is to pump fluid in a reverse direction to clean the filter. In some implementations, the filter loop is coupled at a loop exit to the microfluidic channel so that filtered fluid can re-enter the microfluidic channel and flow toward the second reservoir, while in some other implementations the filter loop is coupled at a loop exit to a sorted particle reservoir so that filtered fluid can be separated from fluid in the second reservoir.

In another example, a microfluidic filtering device includes a microfluidic channel to communicate fluid between a first reservoir and a second reservoir. The device includes multiple nested filter loops, with a first nested filter loop in direct fluid communication with the microfluidic channel and the other nested filter loops in indirect fluid communication with the microfluidic channel through another nested filter loop. A first fluid pump is to induce fluid flow in a forward direction through the nested filter loops, and a particle filter associated with each nested filter loop is to filter particles from the fluid. A second fluid pump is to induce fluid flow in a reverse direction through the nested filter loops to clean the particle filters.

Figure 1:
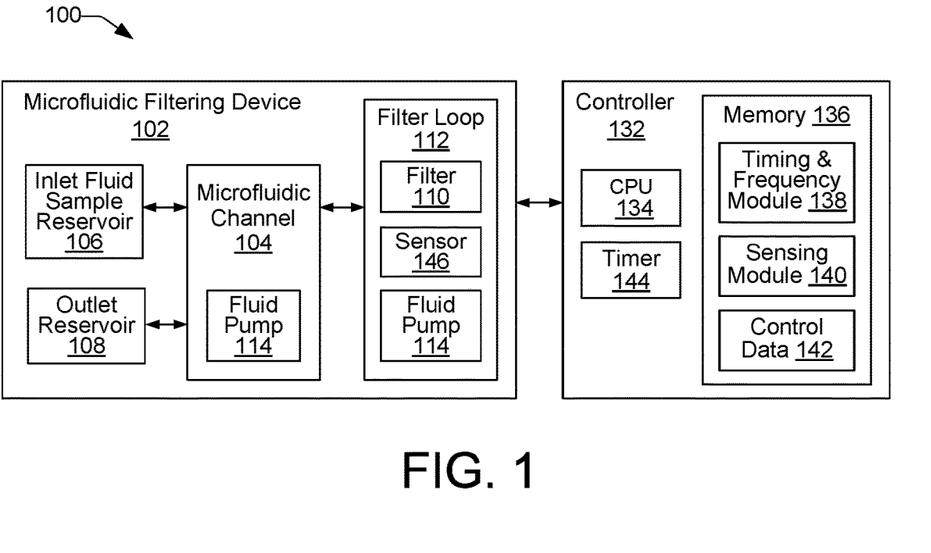
FIG. 1 shows an example of a microfluidic filtration system that includes a microfluidic filtering device for filtering and/or separating particles from a fluid sample.

FIG. 1 shows an example of a microfluidic filtration system 100 that includes a microfluidic filtering device 102 for filtering and/or separating particles from a fluid sample. FIG. 2 (i.e., FIGS. 2a, 2b, 2c, 2d) shows examples of a microfluidic filtering device 102 comprising a single nested filter loop 112. The devices 102 in FIG. 2 are shown in different modes of operation for moving sample fluid through a microfluidic channel 104 between a first inlet reservoir 106 (i.e., inlet fluid sample supply reservoir 106) and a second outlet reservoir 108, and for filtering a portion of the sample fluid through a particle filter 110 (i.e., particle filters 110a, 110b) in a filter loop 112. Referring to FIGS. 1 and 2, an example microfluidic filtering device 102 includes a microfluidic channel 104, a first inlet supply reservoir 106, a second outlet reservoir 108, a filter 110 disposed within a filter loop 112, and a number of fluid pumps 114 (i.e., pumps 114a, 114b, 114c, 114d) disposed at different locations within the microfluidic channel 104 and filter loop 112.

The structures and components of a microfluidic filtration system 100 and, more specifically a microfluidic filtering device 102, can be fabricated using integrated circuit microfabrication techniques such as electroforming, laser ablation, anisotropic etching, sputtering, dry and wet etching, photolithography, casting, molding, stamping, machining, spin coating, laminating, 3-D printing, and/or any combination thereof and/or any other micro-electrical mechanical system (i.e., MEMS), chip or substrate manufacturing technique. Thus, a microfluidic filtering device 102 can include, for example, a plurality of reservoirs 106 and 108, a plurality of fluidic channels (104, 112) such as microfluidic channel 104 and filter loop 112, a plurality of inertial micropumps 114 (i.e., fluid pumps 114) embedded or integrated into the channels, and a plurality of filtration structures 110 (i.e., particle filters 110) all on a single chip or substrate. In addition, a microfluidic filtration system 100 can include a microfluidic filtering device 102 in different topologies, such as one-dimensional, two-dimensional, and/or three-dimensional topologies.

A fluid pump 114 can be implemented, for example, as a thermal bubble resistor element, a piezoelectric element, an acoustic actuator, a piezo membrane actuator, an electrostatic (MEMS) membrane actuator, a mechanical/impact driven membrane actuator, a voice coil actuator, a magnetostrictive drive actuator, a mechanical drive, and/or any other fluid and/or mechanical displacement actuator. When a fluid pump 114 is activated within a channel (e.g., 104, 112), the pump 114 generates a relatively high pressure (e.g., an inertial bubble-driven pressure) for a temporary or short duration to induce fluid flow through the channel. Fluid flow through the channel can be induced by a fluid pump 114 that is active and is asymmetrically located within the channel.

Figure 2A:
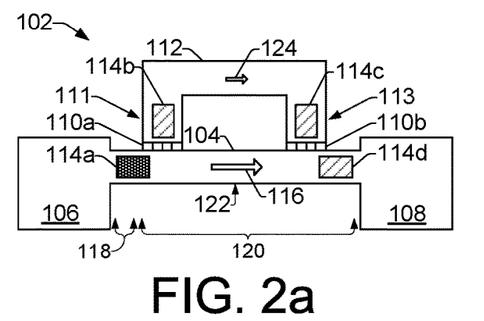
FIGS. 2a, 2b, 2c and 2d show example of a microfluidic filtering device comprising a single nested filter loop 112.

For example, as shown in FIG. 2a, an active fluid pump 114a (indicated as a dark shaded pump 114a) can induce fluid flow through microfluidic channel 104 in a forward direction as indicated by forward arrow 116. In the FIG. 2a example, the light shading of fluid pumps 114b, 114c and 114d indicates that these pumps are pumps that are not active. In some examples, light shaded pumps such as pumps 114b, 114c and 114d in FIG. 2a can indicate that no pump is present at that location. In general, the asymmetric placement of a fluid pump within a microfluidic channel 104 creates a short side 118 (e.g., a short arm) of the channel 104 and a long side 120 (e.g., a long arm) of the channel 104, as shown in FIG. 2a with respect to active fluid pump 114a. The asymmetric location of the pump 114a relative to the center 122 of the channel 104 in this manner creates inertial conditions that drive net fluid flow in a direction 116 toward the long side 120 of the channel 104. That is, the fluid pump element 114a in the FIG. 2a example induces unidirectional fluid flow (i.e., fluid flow in one direction) within the channel 104 from the first reservoir 106 toward the second reservoir 108 when the pump 114a is activate. In this example, the flow of fluid in direction 116 can be considered to be a forward direction 116.

Referring still to FIG. 2a, a second forward direction arrow 124 is intended to indicate that the active fluid pump 114a also induces some fluid flow through the filter loop 112. The forward direction arrow 124 is smaller than the forward direction arrow 116 to indicate that in this example (i.e., with fluid pump 114a being active, and fluid pumps 114b, 114c, 114d being inactive or not present) the flow through the filter loop 112 can be somewhat less and/or weaker than the flow through the microfluidic channel 104. As fluid is pushed into the filter loop 112 from microfluidic channel 104, it passes through a filter 110a. In some examples, a filter loop 112 can include an additional filter such as 110b. A filter 110, such as filter 110a, can be implemented for example as a particle tolerant architecture comprising an array of posts or other physical structures that have gaps or pore sizes designed to filter or separate particles or objects that exceed a particular size.

Figure 3:
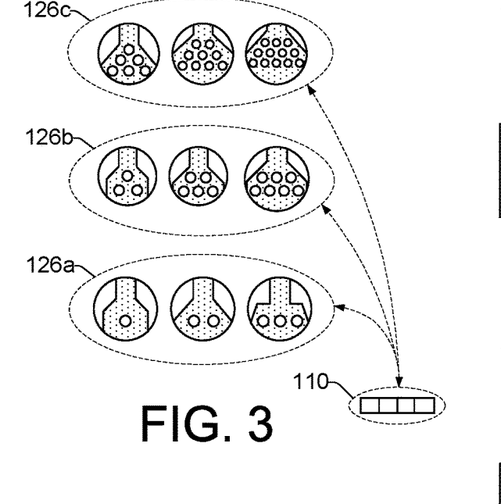
FIG. 3 shows an example of a particle filter comprising a particle tolerant architecture to filter out varying particle sizes.

FIG. 3 shows an example of a particle filter 110 comprising a particle tolerant architecture to filter out varying particle sizes. As shown in FIG. 3, an example particle tolerant architecture 126 (illustrated as 126a, 126b, and 126c) can comprise a post or array of posts that can provide a variety of different gap sizes through which particles can pass through or be filtered through. There are many ways such a filter architecture can be implemented. In some examples, as shown in FIG. 3, such an architecture can comprise an N row by M column configuration of posts. In a specific example, a filter architecture 126a can comprise a single row of posts with a varying numbers of columns. In another example, a filter architecture 126b can comprise a double row of posts with a varying numbers of columns. In another example, a filter architecture 126c can comprise a triple row of posts with a varying numbers of columns.

Figure 2B:
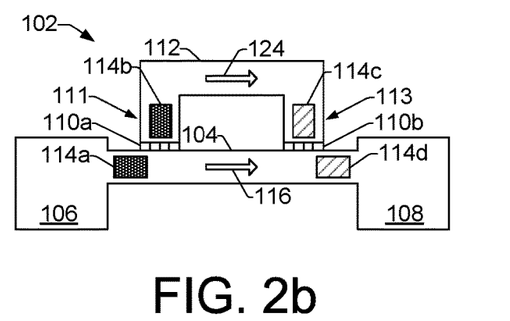

Referring again to FIG. 2 (i.e., FIGS. 2a, 2b, 2c, 2d), as noted above a microfluidic filtering device 102 can have different modes of operation for moving sample fluid through a microfluidic channel 104 and through a filter loop 112 for filtering a portion of the sample fluid through a particle filter 110 (i.e., particle filters 110a, 110b) in a filter loop 112. In one example mode of operation, as discussed above with regard to FIG. 2a, an active fluid pump 114a can induce fluid flow in a forward direction 116 through the microfluidic channel 104 and in a forward direction 124 through the filter loop 112 and the filter 110a. FIG. 2b shows another example mode of operation in which another active fluid pump 114b can induce additional fluid flow in a forward direction 124 through the filter loop 112 and the filter 110a. As shown in FIG. 2b, the fluid pump 114b is located in the filter loop 112 at the loop entry 111 where fluid enters the filter loop 112 through filter 110a from the microfluidic channel 104. The fluid pump 114b is dark shaded in FIG. 2b to indicate that it is an active pump. Activation of fluid pump 114b induces fluid flow toward the long arm of the filter loop 112 in a manner similar to that discussed above with regard to FIG. 2a. The larger forward direction arrow 124 shown in FIG. 2b compared to the smaller forward direction arrow 124 shown in FIG. 2a is intended to indicate that the activation of fluid pump 114b increases the amount of fluid flowing through the filter loop 112 and through the filters 110a and 110b. Thus, FIGS. 2a and 2b illustrate operation modes in which fluid flow is induced in a forward direction 116 through the microfluidic channel and a forward direction 124 through the filter loop 112.

Figure 2C:
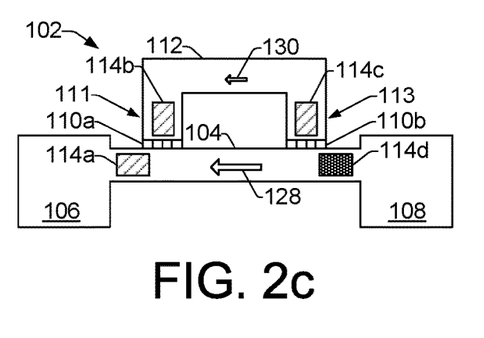
Figure 2D:
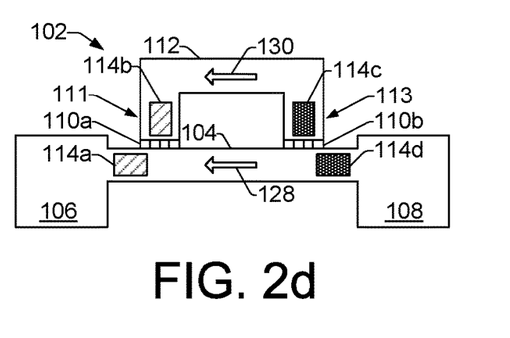

Referring now to FIGS. 2c and 2d, modes of operation are shown in which fluid flow is induced in a reverse direction. In some examples, fluid flow can be induced in a reverse direction to help clean particles out of the filters 110a and 110b, as discussed below. As shown in FIG. 2c, fluid pump 114d is shaded dark, indicating it is an active fluid pump. Fluid pumps 114a, 114b and 114c are not active, as indicated by their light shading. The active fluid pump 114d induces fluid flow in a reverse direction 128 away from the second reservoir 108 and back toward the first reservoir 106. A second reverse direction arrow 130 in the filter loop 112 is intended to indicate that the active fluid pump 114d also induces some fluid flow through the filter loop 112. The reverse direction arrow 130 is smaller than the reverse direction arrow 128 to indicate that in this example (i.e., with fluid pump 114d being active, and fluid pumps 114a, 114b, 114c being inactive or not present) the reverse flow through the filter loop 112 can be somewhat less and/or weaker than the reverse flow through the microfluidic channel 104.

FIG. 2d shows another example mode of operation in which another active fluid pump 114c can induce additional fluid flow in a reverse direction 130 through the filter loop 112. As shown in FIG. 2d, the fluid pump 114c is located in the filter loop 112 at the loop exit 113 where fluid exits the filter loop 112 through filter 110b back into the microfluidic channel 104. As shown in FIG. 2d, the fluid pump 114c is dark shaded to indicate that it is an active pump. Activation of fluid pump 114c induces fluid flow in a reverse direction 130 toward the long arm of the filter loop 112 in a manner similar to that discussed above with regard to FIG. 2a. The larger reverse direction arrow 130 shown in FIG. 2d compared to the smaller reverse direction arrow 130 shown in FIG. 2c is intended to indicate that the activation of fluid pump 114c increases the amount of fluid flowing in the reverse direction 130 through the filter loop 112 and through the filters 110a and 110b. Thus, FIGS. 2c and 2d illustrate operation modes in which fluid flow is induced in a reverse direction 128 through the microfluidic channel 104 and a reverse direction 130 through the filter loop 112.

Reversing the direction of fluid flowing through a filter loop 112 and filter 110 can help to clean out filtered particles that are trapped within the filter 110 that may be clogging the filter and reducing fluid flow into the filter loop 112. Referring again to FIGS. 1 and 2 (i.e., FIGS. 2a, 2b, 2c, 2d), an example microfluidic filtration system 100 includes a controller 132 to control the functionality of various components of a microfluidic filtering device 102 to perform different modes of operation such as discussed above with regard to the examples in FIGS. 2a, 2b, 2c and 2d. Thus, controller 132 can control system components such as fluid pumps 114, for example, to enable different modes of operation in which the amount and direction of fluid flow from the first reservoir 106 through a microfluidic channel 104, filter loops 112, and particle filters 110 can be controlled to achieve different levels of filtration and/or particle separation as well as active and passive filter self-cleaning.

As shown in FIG. 1, an example controller 132 can include a processor (CPU) 134 and a memory 136. The controller 132 may additionally include other electronics (not shown) for communicating with and controlling the various components of microfluidic filtration system 100, such as discrete electronic components and an ASIC (application specific integrated circuit). Memory 136 can include both volatile (i.e., RAM) and nonvolatile memory components (e.g., ROM, hard disk, optical disc, CD-ROM, magnetic tape, flash memory, etc.). The components of memory 136 comprise non-transitory, machine-readable (e.g., computer/processor-readable) media that provide for the storage of machine-readable coded program instructions, data structures, program instruction modules, and other data and/or instructions executable by a processor 134 of the system 100.

An example of instructions stored in memory 136 include instructions associated with modules 138 and 140, while an example of stored data includes control data 142. In some examples, controller 132 can receive data 142 from a host system such as a computer. Data 142 represents, for example, data such as pumping frequency data and pump timing data associated with controlling the movement of fluid through the system 100. Using control data 142, the processor 134 can execute instructions (e.g., from modules 138 and 140) to control components of system 100, such as fluid pumps 114, to vary the amount and direction of fluid flow through a microfluidic channel 104 and a filter loop 112. Modules 138 and 140 include programming instructions executable by processor 134 to cause the microfluidic filtration system 100 to perform various operations related to activating fluid pumps in response to timing information from a timer 144 and/or information from a sensor 146 embedded within a filter loop, including the operations of methods 800 and 900 described below with reference to flow diagrams in FIGS. 8 and 9, respectively.

In some examples, instructions from a timing and frequency module 138 are executable on processor 134 in different implementations to control the timing and frequency of activation of different fluid pumps 114 to induce fluid flow through a microfluidic channel 104 and/or a filter loop 112 of a microfluidic filtering device 102. In some examples, the timing of activation of a fluid pump 114 can be based on a time interval that elapses after initiating a timer 144. Such timed fluid pump activations can be implemented, for example, to perform passive self-cleaning operations on a particle filter 110. Referring to FIGS. 2b and 2d, for example, a timer 144 can be started when a fluid pump 114b begins pumping fluid in a forward direction 124 through a filter loop 112 as shown in FIG. 2b. After a certain time interval has elapsed as determined from the timer 144, a fluid pump 114d can be activated to pump fluid in a reverse direction 130 through the filter loop 112 as shown in FIG. 2d. The fluid pump 114d can remain active to pump fluid in the reverse direction 130 for a predetermined amount of time (as measured from timer 144) sufficient to flush particles out of filter 110a, thus cleaning filter 110a.

Figure 4A:
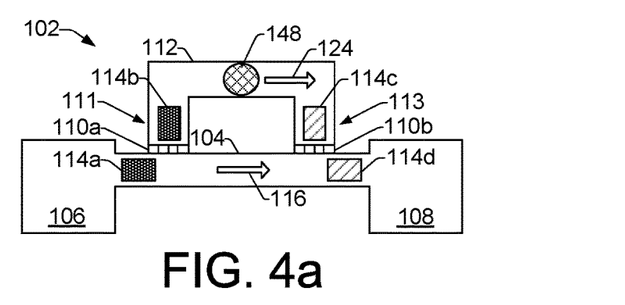
FIGS. 4a and 4b show an example of a microfluidic filtering device where a filter loop channel includes an embedded sensor.
Figure 4B:
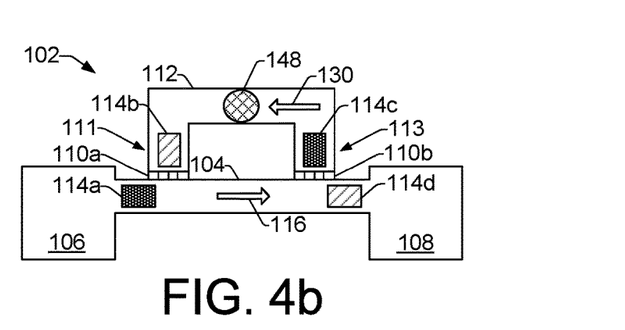

In some examples, instructions from a sensing module 140 are executable on processor 134 in different implementations to control the activation of different fluid pumps 114 in a microfluidic filtering device 102 based on sensory information from a sensor 146 embedded within a fluid channel such as a filter loop 112 channel. Such sensor-based fluid pump activations can be implemented, for example, to perform active self-cleaning operations on a particle filter 110. FIGS. 4a and 4b show an example of a microfluidic filtering device 102, such as the device 102 shown in FIG. 2, where a filter loop 112 channel comprises an embedded sensor 148. In different examples, a sensor 148 may be implemented as different sensor devices that can include, for example, an internal optical sensor, an external optical imaging system, a pCoulter/Impedance sensor, a flow sensor, a pressure sensor, combinations thereof and so on. Such sensors can sense different characteristics of the fluid within the filter loop 112, such as the size of particles within the fluid, the flow rate of the fluid, the pressure of the fluid within the loop, and so on.

Referring to FIG. 4a, in some examples one or multiple fluid pumps such as fluid pumps 114a and 114b can be active (as indicated by dark shading) to pump fluid in a forward direction 116 through a microfluidic channel 104 and in a forward direction 124 through a filter loop 112 channel. Sensor 148 can sense a characteristic or other information about the fluid and/or particles within the fluid flowing through the filter loop 112 and provide the sensed information to processor 134 executing sensing module 140 for analysis. In response to the sensed information from sensor 148, processor 134 can control any of the fluid pumps 114 to alter the flow of fluid within the microfluidic channel 104 and/or filter loop 112 channel. For example, in one scenario the sensor 148 might sense that the rate of fluid flow through the filter loop 112 has decreased below a certain flow rate threshold. In some examples, such a scenario may develop if a particle filter 110a has become clogged with particles and is blocking some or all of the fluid flow through the filter loop 112 in the forward direction 124. In response to the sensed low flow rate from sensor 148, the processor 134 can temporarily activate fluid pump 114c while temporarily deactivating fluid pump 114b, as shown in FIG. 4b, to cause fluid to flow through the filter loop 112 in the reverse direction 130. Such a flow in the reverse direction 130 can flush particles out of the particle filter 110a into microfluidic channel 104 where they can be transported to the second reservoir 108. In this way, and active sensor-based process enables active self-cleaning of particle filters within a microfluidic filtering device 102.

FIGS. 5 (5a, 5b, 5c and 5d), FIGS. 6 (6a, 6b, 6c, 6d, 6e and 6f) and FIGS. 7 (7a, 7b, 7c, 7d and 7e) show additional examples of microfluidic filtering devices 102 having alternate geometries and configurations. The concepts discussed above with regard to the example microfluidic filtering device 102 of FIG. 2 apply in a similar manner to the alternate examples shown in FIGS. 5, 6 and 7. Thus, different modes of operation in the example microfluidic filtering devices 102 of FIGS. 5, 6 and 7 can be controlled by controller 132 and performed by components of the devices 102 in a manner similar to that discussed above with regard to FIGS. 2a, 2b, 2c and 2d.

Referring to FIG. 5, example microfluidic filtering devices 102 each with a single nested filter loop 112 include fluid pumps 114 (illustrated as fluid pumps 114a, 114b, 114c and 114d) located within cavities 150 of a filter loop 112. The cavities 150 comprise auxiliary sections of the filter loops that are not located directly in line with the flow of fluid through the filter loop 112. Although the cavities 150 are illustrated as being co-linear with the upper portion of filter loop 112 and at either end of the upper portion of the filter loop 112, other implementations are possible. For example, a cavity can be situated at an angle with respect to the filter loop and can be disposed along the filter loop 112 in different locations. Providing fluid pumps 114 within such cavities 150 instead of directly in the filter loop 112 helps to avoid damage to fragile cells or other particles that may be carried within a fluid sample flowing through the filter loop 112. Activation of a fluid pump 114, such as a thermal bubble resistor pump, can generate a high pressure region around the pump 114 that may damage fragile cells or other fragile particles. When fluid pumps 114 are located in cavities 150, the probability of damage to fragile cells or other particles within fluid flowing through the filter loop 112 is reduced.

Referring still to examples shown in FIG. 5, example modes of operation similar to those discussed above with regard to FIG. 2 can be implemented. Thus, in one example mode of operation shown in FIG. 5a, an active fluid pump 114a can induce fluid flow in a forward direction 116 through the microfluidic channel 104 and in a forward direction 124 through the filter loop 112 and the filter 110a. FIG. 5b shows another example mode of operation in which another active fluid pump 114b can induce additional fluid flow in a forward direction 124 through the filter loop 112 and the filter 110a.

Figure 5A:
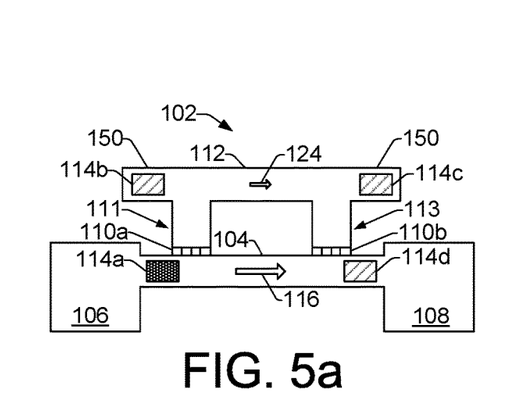
FIGS. 5a, 5b, 5c and 5d show examples of microfluidic filtering devices that each include a single nested filter loop with fluid pumps 114 located within cavities of a filter loop.
Figure 5B:
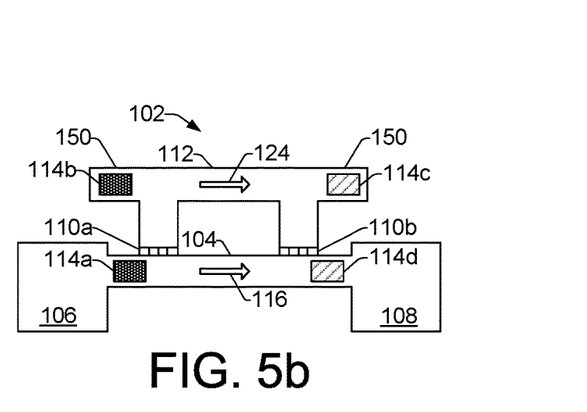
Figure 5C:
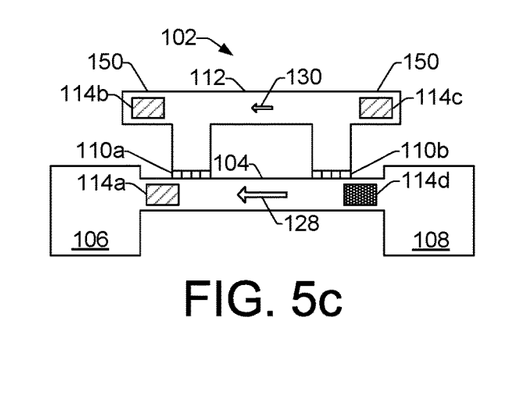
Figure 5D:
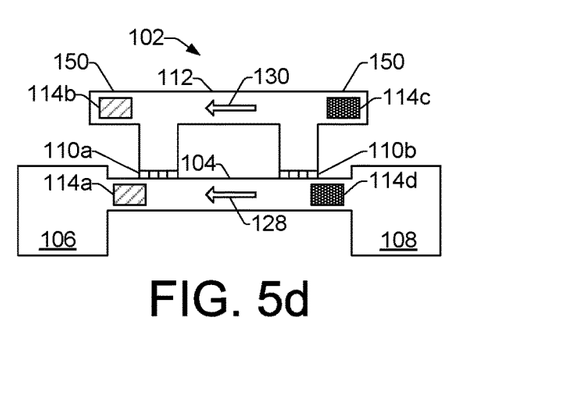

In FIGS. 5c and 5d, modes of operation are shown in which fluid flow is induced in a reverse direction. In some examples, fluid flow can be induced in a reverse direction to help clean particles out of the filters 110. As shown in FIG. 5c, the active fluid pump 114d induces fluid flow in a reverse direction 128 away from the second reservoir 108 and back toward the first reservoir 106. A second reverse direction arrow 130 in the filter loop 112 is intended to indicate that the active fluid pump 114d also induces some fluid flow through the filter loop 112. The reverse direction arrow 130 is smaller than the reverse direction arrow 128 to indicate that in this example (i.e., with fluid pump 114d being active, and fluid pumps 114a, 114b, 114c being inactive or not present) the reverse flow through the filter loop 112 can be somewhat less and/or weaker than the reverse flow through the microfluidic channel 104. FIG. 5d shows an example mode of operation in which another active fluid pump 114c can induce additional fluid flow in a reverse direction 130 through the filter loop 112. The larger reverse direction arrow 130 shown in FIG. 5d compared to the smaller reverse direction arrow 130 shown in FIG. 5c is intended to indicate that the activation of fluid pump 114c increases the amount of fluid flowing in the reverse direction 130 through the filter loop 112 and through the filters 110a and 110b. Thus, FIGS. 5c and 5d illustrate operation modes in which fluid flow is induced in a reverse direction 128 through the microfluidic channel 104 and a reverse direction 130 through the filter loop 112.

Referring to FIG. 6 (FIGS. 6a, 6b, 6c, 6d, 6e and 6f), example microfluidic filtering devices 102 each comprise a single nested filter loop 112 having two loop exits to enable sorting of filtered fluid into a sorting reservoir. As shown in each of the FIG. 6 examples, in addition to a second outlet reservoir 108, the microfluidic filtering devices 102 include a sorting reservoir 152. The sorting reservoir 152 is to receive filtered fluid that flows through an additional exit 154 of the filter loop 112. The filtering devices 102 in the FIG. 6 examples can include an additional fluid pump 114e located within the filter loop 112 at the additional exit 154.

Thus, additional operational modes can be implemented and controlled by controller 132, for example, in which sample fluid is moved through the microfluidic channel 104 and through the filter loop 112 to filter fluid in different ways through different particle filters 110.

Figure 6A:
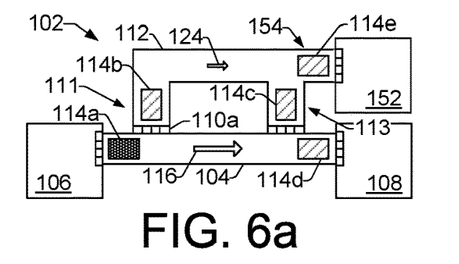
FIGS. 6a, 6b, 6c, 6d, 6e and 6f show examples of microfluidic filtering devices that each include a single nested filter loop having two loop exits to enable sorting of filtered fluid into a sorting reservoir.
Figure 6B:
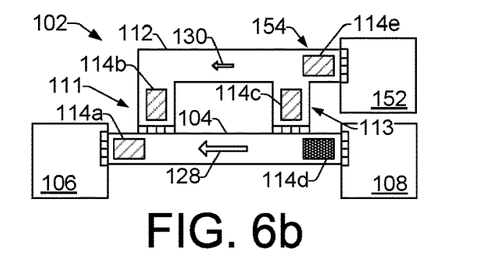
Figure 6C:
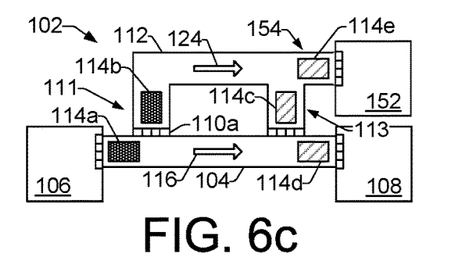
Figure 6D:
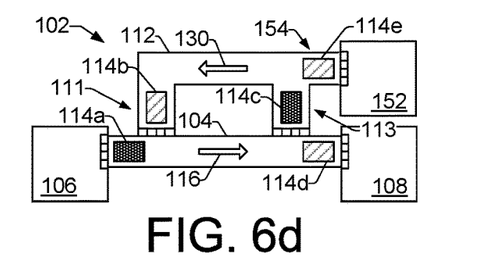
Figure 6E:
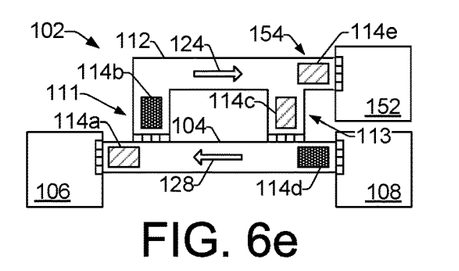
Figure 6F:
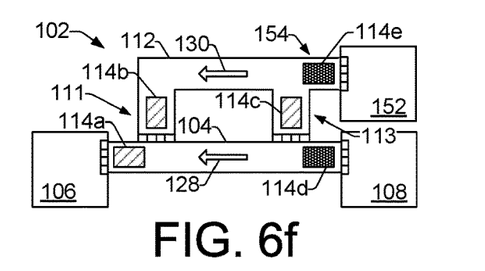

As shown in FIG. 6a, for example, an active fluid pump 114a can induce fluid flow in a forward direction 116 through the microfluidic channel 104 and in a forward direction 124 through the filter loop 112 and the filter 110a. FIG. 6c shows another example mode of operation in which another active fluid pump 114b can induce additional fluid flow in a forward direction 124 through the filter loop 112 and the filter 110a. FIG. 6e shows an example device 102 in which an active fluid pump 114b induces fluid flow through the filter loop 112 in a forward direction 124 while an active filter 114d induces fluid flow in a reverse direction 128 through the microfluidic channel 104. FIG. 6b shows an example device 102 in which an active fluid pump 114d induces fluid flow through the filter loop 112 in a reverse direction 130 and through the microfluidic channel 104 in a reverse direction 128. FIG. 6d shows an example device 102 in which an active fluid pump 114a induces fluid flow through the microfluidic channel 104 in a forward direction 116 while an active filter 114c induces fluid flow in a reverse direction 130 through the filter loop 112. FIG. 6f shows an example device 102 in which an active fluid pump 114e located in the additional exit 154 induces fluid flow through the filter loop 112 in a reverse direction 130 while an active filter 114d induces fluid flow in a reverse direction 128 through the microfluidic channel 104. The various operation modes described can be actively and/or passively controlled by a processor as generally described above to achieve, for example, various fluid filtration and/or particle sorting results as well as active and passive self-cleaning of particle filters 110.

Referring to FIG. 7 (FIGS. 7a, 7b, 7c, 7d and 7e), example microfluidic filtering devices 102 each comprise multiple nested filter loops 112 to enable sorting of filtered fluid into different sorting reservoirs. The multiple nested filter loops 112 with the corresponding additional fluid pumps 114x, particle filters 110x and sorting reservoirs 152x enable numerous operational modes in which fluid can be directed throughout the filtering device 102 to achieve different filtering and/or particle sorting results as well as active and passive self-cleaning of particle filters 110. As shown in FIG. 7a, different example particle filters 110 can comprise particle tolerant architectures 126 to filter out varying particle sizes. As discussed above with regard to FIG. 3, example particle tolerant architectures 126 (illustrated as 126a, 126b, and 126c) can comprise varying arrays of posts that can provide a variety of different gap sizes through which particles can pass through or be filtered through. Referring to FIG. 7b, a microfluidic filtering devices 102 comprises multiple nested filter loops 112 that include cavities 150 in which fluid pumps 114 are located. As discussed above with reference to FIG. 5, cavities 150 comprise auxiliary sections of a filter loop that help to isolate fluid pumps 114 from the general flow of fluid through the loop so that high pressure resulting from fluid pump activations does not damage fragile cells or other particles that may be carried within a fluid sample flowing through the filter loop 112. FIGS. 7c, 7d and 7e show variations of microfluidic filtering devices 102 in which multiple nested filter loops 112 are cascaded above one another off of the microfluidic channel 104. In the example in FIG. 7c, sorting reservoirs 152x enable sorting of filtered fluid that flows through respective filter loops 112 and particle filters 110x.

Figure 7A:
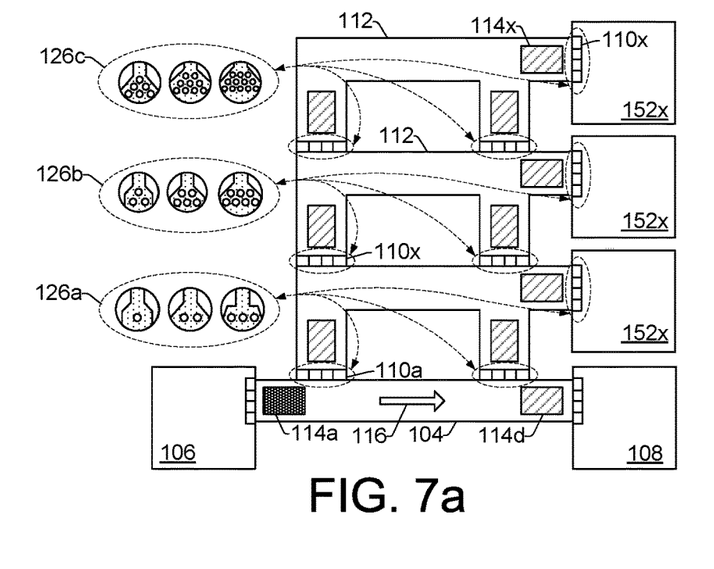
FIGS. 7a, 7b, 7c, 7d and 7e show examples of microfluidic filtering devices that each include multiple nested filter loops.
Figure 7B:
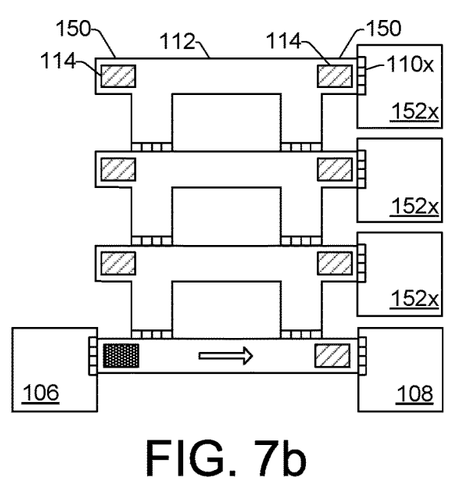
Figure 7C:
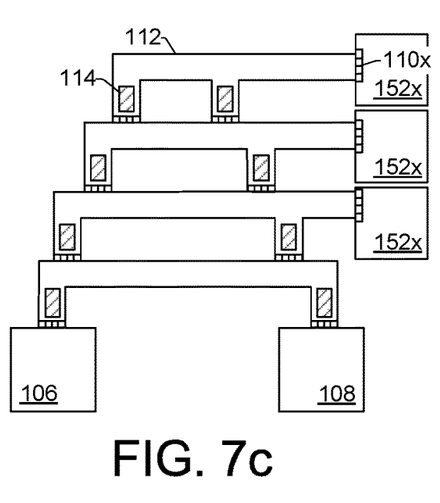
Figure 7D:
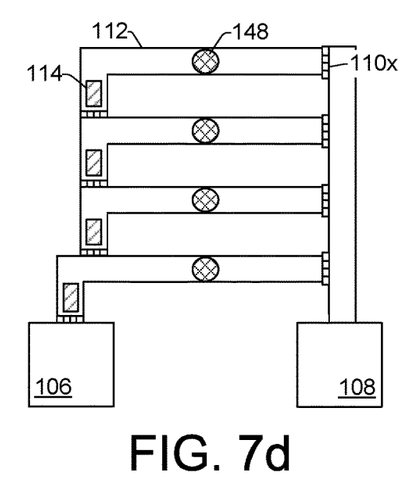
Figure 7E:
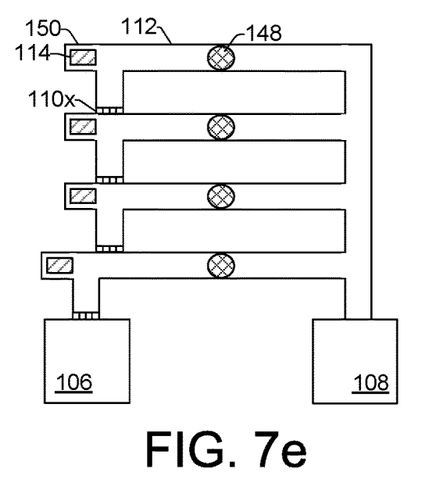

In the example devices 102 shown in FIGS. 7d and 7e, each of the filter loops 112 include a sensor 148. As noted above with reference to FIGS. 4a and 4b, sensors 148 can provide sensed information about fluid and particles flowing through filter loops 112 that can be used to control fluid pumps 114 and other components of a filter device 102.

Figure 8:
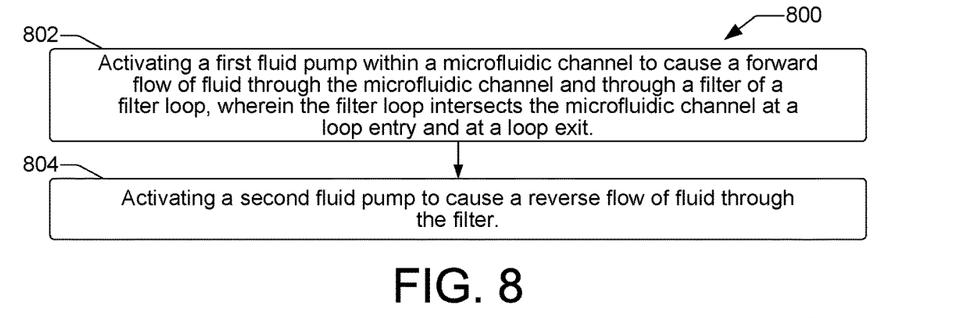
FIGS. 8 and 9 are flow diagrams that show example methods of microfluidic filtering in a microfluidic filtering device.
Figure 9:
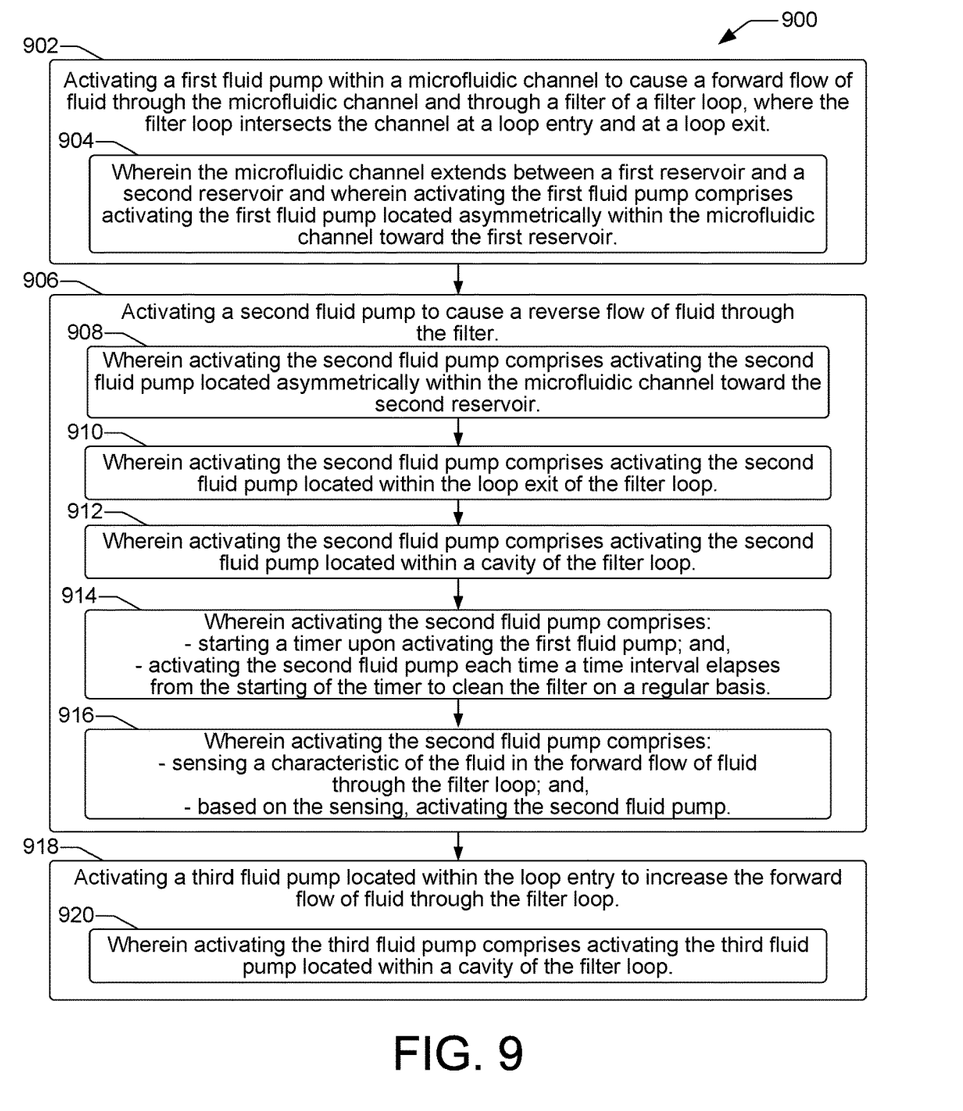

FIGS. 8 and 9 are flow diagrams showing example methods 800 and 900 of microfluidic filtering in a microfluidic filtering device 102 and system 100 such as discussed above with regard to FIGS. 1 through 7. Method 900 is an extension of method 800 that incorporates additional details of a microfluidic filtering method. The methods can be performed in a microfluidic filtering device 102 and system 100 under the control of a controller having a processor to execute control instructions such as controller 132 shown in FIG. 1.

Referring now to method 800 of FIG. 8, as shown at block 802, an example method of microfluidic filtering includes activating a first fluid pump within a microfluidic channel to cause a forward flow of fluid through the microfluidic channel and through a filter of a filter loop, where the filter loop intersects the microfluidic channel at a loop entry and at a loop exit. The method 800 can continue as shown at block 804 with activating a second fluid pump to cause a reverse flow of fluid through the filter.

As noted above, method 900 is an extension of method 800 that incorporates additional details of a microfluidic filtering method. Thus, as shown at block 902, method 900 includes activating a first fluid pump within a microfluidic channel to cause a forward flow of fluid through the microfluidic channel and through a filter of a filter loop, where the filter loop intersects the microfluidic channel at a loop entry and at a loop exit. In some examples as shown at block 904, the microfluidic channel extends between a first reservoir and a second reservoir and activating the first fluid pump comprises activating the first fluid pump located asymmetrically within the microfluidic channel toward the first reservoir.

The method 900 continues at block 906 with activating a second fluid pump to cause a reverse flow of fluid through the filter. In some examples, as shown at block 908, activating the second fluid pump can include activating the second fluid pump located asymmetrically within the microfluidic channel toward the second reservoir. In some examples, activating the second fluid pump can include activating the second fluid pump located within the loop exit of the filter loop, as shown at block 910. As shown at block 912, in some examples activating the second fluid pump includes activating the second fluid pump located within a cavity of the filter loop. In some examples, activating the second fluid pump can include starting a timer upon activating the first fluid pump, and activating the second fluid pump each time a time interval elapses from the starting of the timer to clean the filter on a regular basis, as shown at block 914. In some examples, as shown at block 916, activating the second fluid pump includes sensing a characteristic of the fluid in the forward flow of fluid through the filter loop, and based on the sensing, activating the second fluid pump.

As shown at block 918, the method 900 can further include activating a third fluid pump located within the loop entry to increase the forward flow of fluid through the filter loop. In some examples, activating the third fluid pump includes activating the third fluid pump located within a cavity of the filter loop, as shown at block 920.

What is claimed is:

1. A method of microfluidic filtering, comprising:
   activating a first fluid pump within a microfluidic channel to cause a forward flow of fluid through the microfluidic channel and through a filter of a filter loop, the filter loop intersecting the microfluidic channel at a loop entry and at a loop exit; and,
   activating a second fluid pump to cause a reverse flow of fluid through the filter.

2. A method as in claim 1, wherein the microfluidic channel extends between a first reservoir and a second reservoir and wherein:
   activating the first fluid pump comprises activating the first fluid pump located asymmetrically within the microfluidic channel toward the first reservoir.

3. A method as in claim 2, wherein activating the second fluid pump comprises activating the second fluid pump located asymmetrically within the microfluidic channel toward the second reservoir.

4. A method as in claim 1, wherein activating the second fluid pump comprises activating the second fluid pump located within the loop exit of the filter loop.

5. A method as in claim 1, wherein activating the second fluid pump comprises activating the second fluid pump located within a cavity of the filter loop.

6. A method as in claim 1, wherein activating the second fluid pump comprises:
   starting a timer upon activating the first fluid pump; and,
   activating the second fluid pump each time a time interval elapses from the starting of the timer to clean the filter on a regular basis.

7. A method as in claim 1, wherein activating the second fluid pump comprises:
   sensing a characteristic of the fluid in the forward flow of fluid through the filter loop; and,
   based on the sensing, activating the second fluid pump.

8. A method as in claim 1, further comprising activating a third fluid pump located within a cavity of the filter loop to increase the forward flow of fluid through the filter loop.

9. A microfluidic filtering device comprising:
   a microfluidic channel to communicate fluid between a first reservoir and a second reservoir;
   a filter loop coupled to the microfluidic channel at a loop entry;
   a filter at the loop entry to filter fluid entering the filter loop from the microfluidic channel;
   a forward pump to pump fluid in a forward direction from the microfluidic channel through the filter into the filter loop; and,
   a reverse pump to pump fluid in a reverse direction opposite the forward direction to clean the filter.

10. A microfluidic filtering device as in claim 9, wherein the filter loop is further coupled at a loop exit to a sorted reservoir to receive filtered fluid.

11. A microfluidic filtering device as in claim 9, wherein:
   the forward pump comprises a fluid pump located within the loop entry of the filter loop to pump fluid in the forward direction from the loop entry toward a loop exit and creating a forward flow through the filter; and,
   the reverse pump comprises a fluid pump located within the loop exit to pump fluid in the reverse direction from the loop exit toward the loop entry creating a reverse flow through the filter.

12. A microfluidic filtering device as in claim 9, further comprising a sensor embedded in the filter loop to sense a characteristic of fluid in the filter loop and to activate the reverse pump based on the sensed characteristic.

13. A microfluidic filtering device comprising:
   a microfluidic channel to communicate fluid between a first reservoir and a second reservoir;
   multiple nested filter loops, wherein a first nested filter loop is in direct fluid communication with the microfluidic channel and every other nested filter loop is in indirect fluid communication with the microfluidic channel through another nested filter loop;
   a first fluid pump to induce fluid flow in a forward direction through the nested filter loops;
   a particle filter associated with each nested filter loop to filter particles from the fluid; and,
   a second fluid pump to induce fluid flow in a reverse direction through the nested filter loops to clean the particle filters.

14. A microfluidic filtering device as in claim 13, wherein the particle filters comprise architectures with filter gaps that decrease in size as the nested filter loops get farther from the microfluidic channel.

15. A microfluidic filtering device as in claim 13, comprising a sorting reservoir associated with each nested filter loop to receive fluid filtered through a particle filter of the associated nested filter loop.

* * * * *